UNITED STATES PATENT OFFICE.

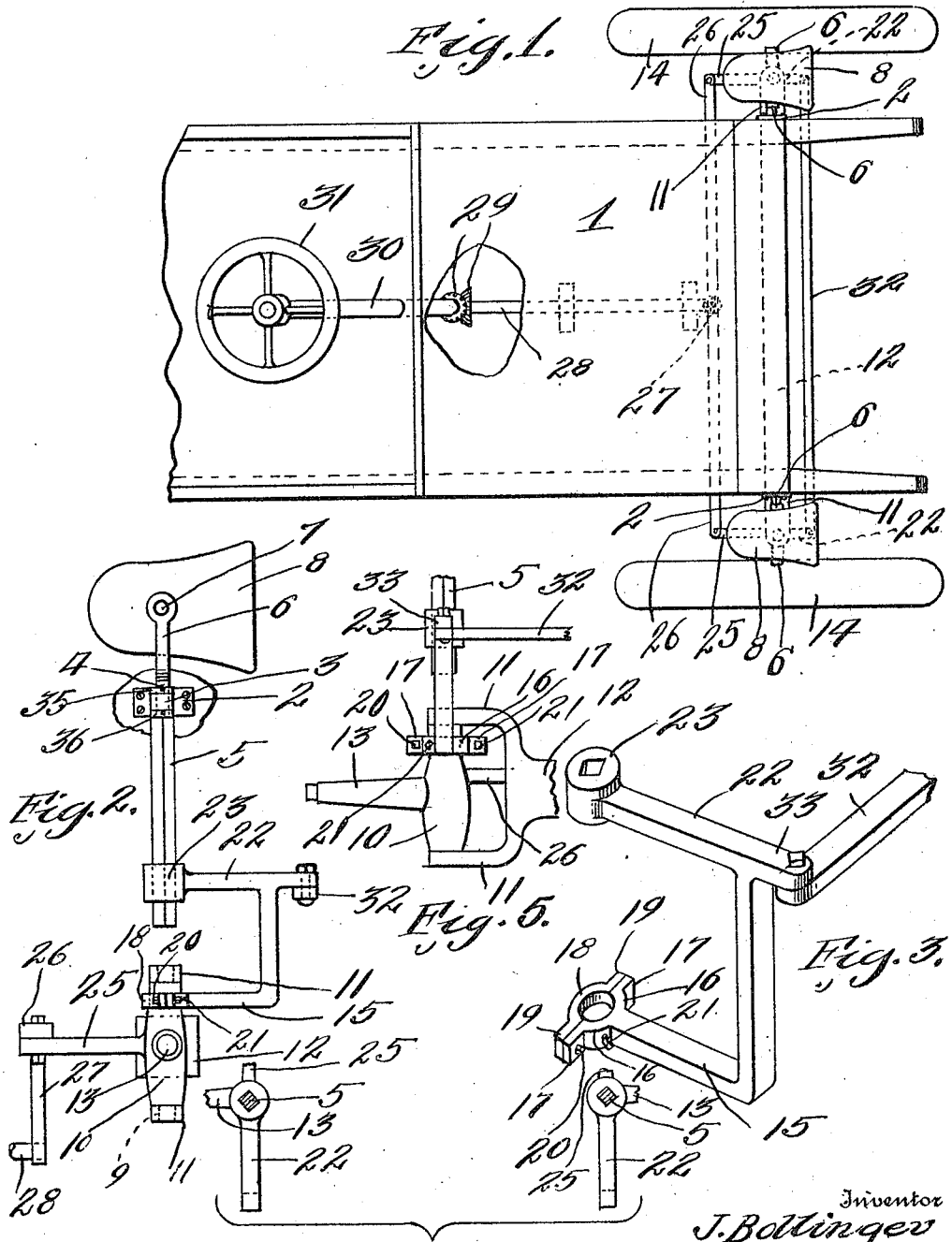

JAMES BOLLINGER, OF WHITEFISH, MONTANA.

DIRIGIBLE LAMP FOR AUTOMOBILES.

1,155,877.  Specification of Letters Patent.  Patented Oct. 5, 1915.

Application filed March 20, 1915. Serial No. 15,736.

*To all whom it may concern:*

Be it known that I, JAMES BOLLINGER, a citizen of the United States, residing at Whitefish, in the county of Flathead and State of Montana, have invented a new and useful Dirigible Lamp for Automobiles; and I do hereby declare the following to be a full, clear, and exact description of the invention, such as will enable others skilled in the art to which it appertains to make and use the same.

This invention relates to the art of illumination, and more especially to dirigible lamps for automobiles, in other words, an improved mechanism connecting the lamps and the knuckle hubs of the front wheels, whereby as the wheels are turned in one direction or the other, the lamps correspondingly move.

An object of the invention is to provide a device of this design, in which improved features of construction are involved.

In practical fields the details of construction may necessitate alterations, falling within the scope of what is claimed.

In the drawings:—Figure 1 is a plan view showing the improved dirigible lamp mechanism as applied to an automobile. Fig. 2 is a view in side elevation of the dirigible clamp mechanism. Fig. 3 is an enlarged detail view of the connections between the lamp and the knuckle hub. Fig. 4 shows collective views in plan of the U-shaped brackets. Fig. 5 is a view in front elevation of a part of the front axle showing one pair of the forks 11, and illustrating one of the U-shaped brackets fixed in place.

Referring more particularly to the drawings, 1 designates a portion of an automobile having the brackets 2, which are provided at their forward portions with sleeve bearings 3, in which the cylindrical portions 4 of the shanks 5 are mounted. The upper end of the shanks 5 are provided with forks 6, in bearings of which pintles or lugs 7 of the lamp 8 are pivotally mounted. Below the cylindrical parts 4, the shanks are rectangular or square in cross section as shown, and moreover, it is observed that said shanks are axially alined with the pivots 9 of the knuckle hub 10 of the knuckle joint between the forks 11 of the front axle 12 and the stub shafts 13, on which the front wheels 14 are mounted. In order to cause the lamp to move correspondingly with the front wheels U-shaped brackets are provided.

The lower arms 15 of said U-shaped brackets are provided with semi-circular fork arms 16 having ears 17, and which arms are clamped as shown to the knuckle hub by means of the semi-circular clamping plates 18 having ears 19, which are drawn toward the ears 17 by the bolts 20. To insure that the U-shaped brackets will move with the knuckle hub, a set screw 21 is threaded through one of the arms 16 of each U-shaped bracket and partially into the knuckle hub. The upper part 22 of each U-shaped bracket is provided with a sleeve 23 rectangular in cross section, and into which the rectangular portion of each shank slidably telescopes or fits, so that as the body of the machine vibrates vertically, the shank will slide vertically through the sleeve 23. It is to be noted that by these improved connections between the knuckle hubs and the shanks 5 (which are axially alined with the pivots of the knuckle hub) the lamps will move correspondingly with the front wheel as they are thrown in one direction or the other. The knuckle hubs are provided with the usual arms 25, which are connected by the usual bar 26, which in turn is moved laterally of the machine by the right angle extending arm 27 of the rock shaft 28, which in turn has beveled gear connections 29 with the steering shaft 30 of the steering wheel 31, so that the front wheels may be turned in one direction or the other, and owing to the bracket connection, the lamps are correspondingly turned.

As shown in Fig. 4 a connecting bar 32 is provided and is connected to the arms 33 of said bracket, so as to insure that the lamps will turn in unison. One of the most essential or important advantages of the foregoing connection between the lamps and said knuckle hub, is that the same may be applied to all machines now in use, simply by swiveling the shanks of the lamp bracket axially alined with the pivots of the knuckle hub, and subsequently connecting the U-shaped brackets between the shank and the knuckle hub in the manner herein set forth.

The collars 35, and 36 are located upon the shanks, one above and one below the cylindrical bearings.

The inventor in this application is well aware that other patents have been granted showing the broad idea of connections between the knuckle joints of the front wheels of an automobile and the lamps thereof, whereby the lamps are dirigible with the wheels, therefore he does not claim broadly any such construction. However, the inventor has devised a particular construction embodying U-shaped brackets, one for each knuckle joint, the lower arm of each U-shaped bracket being connected to move with a knuckle joint, the upper arm overlying the knuckle joint and having a socket opening arranged axially with the knuckle joint, and in which socket opening a shank, rectangular in cross section, of the lamp, has a sliding fit, so that as the knuckle joint is rocked the lamp correspondingly moves, there being a bar connecting the two U-shaped brackets, to permit the brackets to move in synchronism.

The invention having been set forth, what is claimed as new and useful is:—

In combination with the knuckle joints between the front axle and the front wheels of an automobile, brackets secured to the body of the machine and having cylindrical bearings, lamps having shanks provided with cylindrical parts mounted in said bearings swivelly, said shanks being arranged vertically and above and axially with the knuckle joints, U-shaped brackets, the lower arm of each being clamped to and movable with one of the knuckle joints, the other arm having a socket opening rectangular in cross section and arranged axially with the knuckle joint, each shank below its cylindrical part being elongated and rectangular in cross section and having a sliding fit in the rectangular socket opening, so that as the knuckle joint rocks, the shank and lamp will correspondingly rock, and a bar connecting the forward portions of the U-shaped brackets.

In testimony whereof I have signed my name to this specification in the presence of two subscribing witnesses.

JAMES BOLLINGER.

Witnesses:
 ALVA E. MILLER,
 F. W. SCHNERER.